March 3, 1936.  J. R. SWETTA ET AL  2,032,640
SHARPENER
Filed Oct. 1, 1934
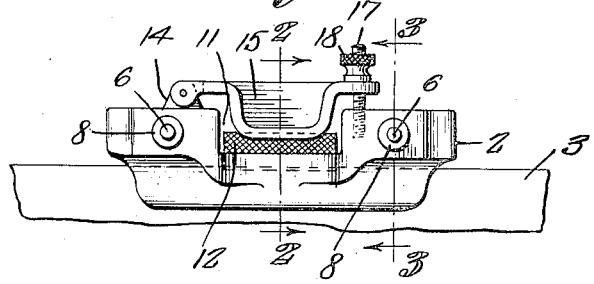
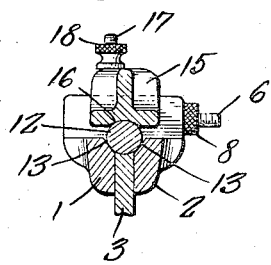 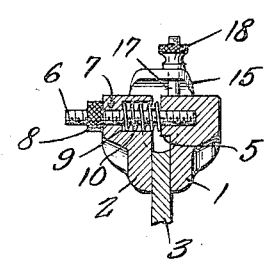
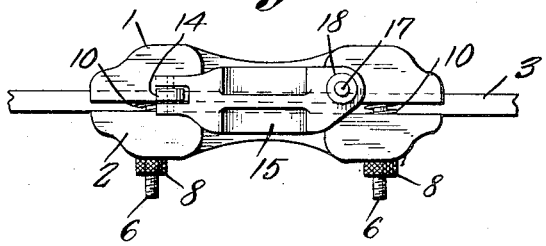
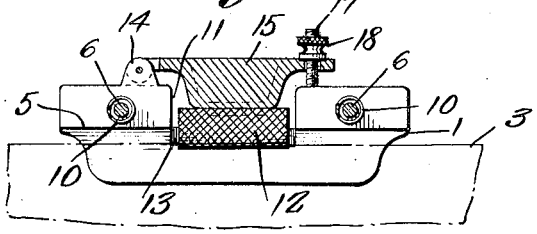
John R. Swetta,
William E. Lehotsky,
INVENTORS
BY Victor J. Evans & Co.
ATTORNEY
WITNESS:

Patented Mar. 3, 1936

2,032,640

UNITED STATES PATENT OFFICE 2,032,640

SHARPENER

John R. Swetta and William E. Lehotsky, Detroit, Mich.

Application October 1, 1934, Serial No. 746,459

3 Claims. (Cl. 76—83)

The object of this invention is to provide a small compact sharpener especially adapted for sharpening skates. It is also an object of the invention to provide a sharpener which may be easily set upon and adjusted to a skate runner or other implement and manipulated to produce the desired edge. These and other objects are attained in such a device as is illustrated in the accompanying drawing and the invention consists in certain novel features which will be particularly defined in the claims following a detailed description.

In the drawing:

Figure 1 is a side elevation of our sharpener in operative position upon a skate runner.

Figure 2 is a transverse section on the line 2—2 of Figure 1.

Figure 3 is a transverse section on the line 3—3 of Figure 1.

Figure 4 is a plan view.

Figure 5 is a central longitudinal section.

A sharpener embodying our invention comprises two counterpart slides or body members 1, 2 which are to be disposed at opposite sides of the skate runner 3, as clearly shown in Figures 2, 3 and 4. The member 1 is formed with a longitudinal shoulder 5 which limits the movement of the member toward the skate runner and also provides an additional support for securely anchoring the bolts or threaded pins 6. Said pins or bolts extend through openings 7 provided therefor in the member 2, and nuts 8 are mounted upon the pins or bolts to be turned home against the member 2 and thereby clamp the members in slidable engagement with the runner. Sockets 9 are formed in the member 2 and coiled expansion springs 10 are seated in said sockets about the pins or bolts and bear against the member 1 so as to force the members apart as the nuts are turned to ride toward the free ends of the bolts whereby the device will be freed from the runner. Unless the nuts are turned entirely off the bolts, however, the body members cannot be separated and, consequently, they are not apt to be lost.

Between their ends, the members 1, 2 are recessed, as shown at 11, to accommodate a file 12 and seats 13 for the file are formed in the edges of the members in the floors of the recesses. A lug 14 is formed on the top of the member 1 at the inner side thereof and a clamp or presser block 15 is pivoted at one end to said lug, said block being properly shaped to enter the recesses 11 and bear upon the file to hold the latter firmly upon the runner during the use of the device. The file is shown with a circular cross section and the presser block is shown with a shallow groove 16 to engage over the file but it must be understood that a file of any desired contour may be used. A bolt 17 is mounted loosely in the free end of the presser block to enter a socket provided therefor in the body member 1 when the block is in operative position, and a nut 18 is mounted on the bolt to be turned home against the block and thereby hold the block firmly to the file.

The manner of using the device will be readily understood from the foregoing description, taken in connection with the accompanying drawing. The device is mounted on the skate runner as shown and described and then reciprocated along the runner, quickly producing the required edge. The device is light and small and may be carried in a garment pocket to be available whenever desired, and may be used without removing the skate from the shoe or person.

Having described our invention, what we claim is:

1. A sharpener comprising members to be disposed at opposite sides of an implement to be sharpened, a file seated in and between the members, a presser block pivotally mounted on one of the members to bear upon the file, adjustable means for locking the free end of the block to the last named member and urging the block to exert pressure on the file, and means for holding the members in slidable engagement with the implement.

2. A sharpener comprising members to be disposed at opposite sides of an implement to be sharpened and having mating recesses between their ends, a file seated in said recesses, a presser block hinged to one of the members, a nut and bolt device for locking the free end of the block to the last named member and urging the block to exert pressure upon the file and hold it to the implement, and means for holding the members in slidable engagement with the implement.

3. A sharpener comprising members to be disposed at opposite sides of an implement to be sharpened, means for holding the members in slidable engagement with the implement, a file seated in and between the members to bear upon the implement, a presser block pivoted at one end upon one of the members and shaped to bear upon the file, a bolt engaged in the last named member and passing loosely through the free end of the presser block, and a nut mounted on the bolt and bearing upon the block.

JOHN R. SWETTA.
WILLIAM EDW. LEHOTSKY.